Patented Mar. 23, 1937

2,074,441

UNITED STATES PATENT OFFICE 2,074,441

PROCESS OF EXTRACTING CHLOROPLASTS

Robert H. Van Sant, Detroit, Mich., assignor, by mesne assignments, to American Chlorophyll, Inc., a corporation of Delaware No Drawing. Application June 8, 1933, Serial No. 674,324

5 Claims. (Cl. 87—28)

The principal object of this invention is to expedite the quantitive extraction of chloroplasts from vegetation, one of the principal features of which, if not the cardinal feature, resides in removing the starchy components of the basic material prior to extracting any of the four pigments. The last mentioned are chlorophyll (a), chlorophyll (b), carotin (carotene or carrotine) and xanthophyll. The first two of these are closely related and for some purposes may be considered as one. They are usually extracted as one and separated afterwards, though the contrary is possible. Prior investigations have resulted in the conclusion that these four pigments are to be found identical in all plants, and comparative investigation has indicated that chlorophyll is of constant composition in all appearances.

All heretofore published methods of extracting chlorophyll from plants, while based on a suitable solvent for extracting the chlorophyll, the action of the solvent has been greatly retarded due to the fact that all plant material contains considerable starchy material. In most cases incomplete extraction has resulted.

In the method here disclosed the starch is treated with a digestant to convert it into soluble sugars and they are washed out with water. Then the chlorophyll solvent can penetrate more readily and completely, whereby the extraction is expedited and the yield increased.

Chlorophyll is thought to contain 4.5% of magnesium in each molecule.

Willstatter is quoted as saying that fresh leaves (without identifying the leaves of what vegetable) contain about two parts of chlorophyll (a) in a thousand, three-fourths of a part of chlorophyll (b) and one-third of a part of xanthophyll and one-sixth of a part of carotin.

By proceeding according to this invention, extractions as high as nine-tenths per cent chlorophyll have been obtained, or nine parts in a thousand.

The choice of vegetable matter, the location of the extraction plant with respect to the source of supply, and other features influence the choice of the preliminary treatment. According to the preferred procedure for a plant located in a northern climate, dry leaves will be the basis of operation and, generally speaking, these may be taken from any green vegetation. Among those now known to be suitable may be listed stinging nettles, mulberry, spinach, alfalfa, clover, pine needles, but these are suggestive only.

Air drying in the shade appears to give very good results, perhaps because it is done at temperatures which do not damage the pigments, and there is no bleaching action, etc., whereas assuming the supply is remote from the place of extraction, the cost of shipping, the danger of injury en route, etc. are eliminated by drying in the shade at or near the place of growth and gathering.

The steps of the process may, for convenience of description, be indicated numerically as follows:

(1) Comminute the dry leaves to a suitable fineness. The means and manner of accomplishing this are a matter of wide selection, the principal care should be to avoid high temperatures, or any great range from temperate atmosphere.

(2) Wash the comminuted leaves with ether to remove waxes and oils. This is particularly desirable in case of vegetation of oily or waxy character.

(3) Reduce the starch components to a condition or character in which they are readily soluble in some solvent that will not dissolve or injure the pigment.

The best way known at present is to put pure water about eight and one-half times the volume of the comminuted leaves in a suitable vessel equipped to maintain a temperature within 2°, plus or minus of 98.2 F., and assuming 200 grams of comminuted leaves, 1700 c. c. of water is approximately correct.

Add one gram of amylaceous enzymes (such as amylopsin, etc.) tested and proven, one to two hundred; that is, one gram will convert two hundred grains of starch into sugar in less than fifteen minutes at 98.2 F.

After the amylaceous enzymes have been thoroughly stirred into the water, add the comminuted leaves and agitate thoroughly, until all starch is converted into sugar. (The time required can be determined by testing samples. One to four hours has proven sufficient.)

(4) Wash out the soluble components with water. The accomplishment of this step will be indicated when the water runs clear and is without odor.

(5) Macerate the residue (which may be called marc, and includes chiefly the pigments mentioned, with lignin and cellulose material) with a solvent selected according to the product sought. Ethyl alcohol serves well when the extract is to be treated with hydrochloric acid and other inorganic acids to produce pheophytin. Acetone is suitable when magnesium chlorophyll is to be the product.

About 1700 c. c. of acetone will be satisfactory for the first maceration, to be followed by others with more or less acetone, according to the condition. The step is complete when the solvent drawn off shows no trace of color.

(6) Distill, evaporate, or otherwise recover the solvents and collect the residue, which will consist chiefly of the pigments if the above has been followed.

Processes for refinement, conversion and application to science and industry are known and reference to the work of Willstatter and Stoll, translated by Scherz and Mertz, will suffice.

The foregoing has been found particularly satisfactory with dried mulberry leaves and alfalfa shipped green from the place of picking, and dried stinging nettle leaves of commerce purchased in the open market. Suitable variations will have to be made for other basic materials which are so various that an attempt to indicate appropriate variations for each would be useless.

Green leaves may be comminuted without drying out but, of course, they are more difficult to handle in a mill, and dried leaves can be much more cheaply shipped from the place of gathering to the extraction plant.

Amylaceous enzymes mentioned in step (3) may be replaced, or supplemented with an extract of the salivary glands or ruminants, or animal diastase, or malt diastase or, in general, any treatment that will make the starch soluble in water without damaging the pigments.

At this point it is well to mention that the enzymes in the digestive tracts of fowls or fish will be found to conform to the principle of this method of extraction. In the case of fish the mass may be treated at a much lower temperature. The water used should conform to the conditions of its habitat. The important thing in this process is to work in the proper temperatures previously determined for the greatest potency of the individual digestant used.

The fineness of the grinding or milling will vary with the leaves and some cut and try will be necessary to determine the optimum for a particular material. With mulberry leaves picked in Florida in early spring 40 mesh gave excellent results, while alfalfa picked in Ohio in May worked better at 20 mesh. Dog fennel leaves have very little cellulose and may be treated with little or no grinding.

I claim as my invention:

1. The process of extracting chloroplasts from starch-containing vegetation which comprises comminuting leaves containing chloroplasts, mixing the comminuted mass with water at approximately blood temperature, adding amylaceous enzymes for converting the starch of said enzymes into sugar, washing out the soluble matter with water, macerating the residue, treating said residue with a chloroplast solvent, removing the liquid content from the mass, and finally evaporating the solvent from said liquid content.

2. The process of removing chloroplasts from starch-containing vegetable matter which contains chloroplasts comprising comminuting said vegetable matter, converting the starch into sugar by treating the mass with an amylaceous enzyme while said mass is in a warm condition but below a temperature that would destroy said enzyme, washing out the soluble matter from the mass with water, removing the liquid from the mass, removing the chloroplasts by treating the residue with a chloroplast solvent of the class consisting of ethyl alcohol and acetone, and finally removing the solvent from the liquid by evaporation.

3. The process of removing chloroplasts from starch-containing vegetable matter which contains chloroplasts comprising comminuting said vegetable matter, removing the waxes and oils by treating the comminuted mass with ether, converting the starch into sugar by treating the residue with an amylaceous enzyme while said residue is in a warm condition but below a temperature that would destroy said enzyme, washing out the soluble matter from the mass with water, removing the liquid from the mass, removing the chloroplasts by treating the residue with a chloroplast solvent of the class consisting of ethyl alcohol and acetone, and finally removing the solvent from the liquid by evaporation.

4. The process of removing chloroplasts from starch-containing vegetable matter which contains chloroplasts comprising comminuting said vegetable matter, converting the starch into sugar by treating the mass with an amylaceous enzyme while said mass is in a warm condition but below a temperature that would destroy said enzyme, washing out the soluble matter from the mass with water, removing the liquid from the mass, removing the chloroplasts by treating the residue with acetone, and finally removing the acetone from the liquid by evaporation.

5. The process of removing chloroplasts from starch-containing vegetable matter which contains chloroplasts comprising comminuting said vegetable matter, converting the starch into sugar by treating the mass with an amylaceous enzyme while said mass is at a temperature within 2° F. above or below 98.2° F., washing out the soluble matter from the mass with water, removing the liquid from the mass, removing the chloroplasts by treating the residue with a chloroplast solvent of the class consisting of ethyl alcohol and acetone, and finally removing the solvent from the liquid by evaporation.

ROBERT H. VAN SANT.